US009444715B2

(12) United States Patent
Pignataro et al.

(10) Patent No.: US 9,444,715 B2
(45) Date of Patent: Sep. 13, 2016

(54) SCALABLE FEDERATED POLICY FOR NETWORK-PROVIDED FLOW-BASED PERFORMANCE METRICS

(71) Applicant: CISCO TECHNOLOGY, INC., San Jose, CA (US)

(72) Inventors: Carlos M. Pignataro, Raleigh, NC (US); Plamen Nedeltchev Nedeltchev, San Jose, CA (US); Aamer Saeed Akhter, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 53 days.

(21) Appl. No.: 14/514,209

(22) Filed: Oct. 14, 2014

(65) Prior Publication Data

US 2016/0105346 A1   Apr. 14, 2016

(51) Int. Cl.
| | | |
|---|---|---|
| H04W 4/00 | (2009.01) | |
| H04L 12/26 | (2006.01) | |
| H04L 29/06 | (2006.01) | |
| H04L 12/24 | (2006.01) | |

(52) U.S. Cl.
CPC .......... *H04L 43/0894* (2013.01); *H04L 41/28* (2013.01); *H04L 43/08* (2013.01); *H04L 63/0435* (2013.01); *H04L 63/065* (2013.01); *H04L 63/104* (2013.01)

(58) Field of Classification Search
CPC .......... H04L 43/0894; H04L 63/0435; H04L 63/104; H04L 41/28; H04L 43/08; H04L 63/065
See application file for complete search history.

(56) References Cited

U.S. PATENT DOCUMENTS

| | | | | |
|---|---|---|---|---|
| 8,792,876 B1 * | 7/2014 | Zhu | ..................... | H04L 12/4641 370/338 |
| 9,092,441 B1 * | 7/2015 | Patiejunas | ......... | G06F 17/30073 |
| 2002/0093915 A1 * | 7/2002 | Larson | ................ | H04L 63/0272 370/235 |
| 2013/0042106 A1 * | 2/2013 | Persaud | ................ | G06F 21/606 713/165 |
| 2013/0091352 A1 * | 4/2013 | Patel | ....................... | H04L 9/321 713/156 |
| 2013/0219035 A1 * | 8/2013 | Detienne | ............... | H04L 9/0833 709/223 |
| 2015/0281028 A1 | 10/2015 | Akhter et al. | | |

FOREIGN PATENT DOCUMENTS

WO    WO 2012/162419    11/2012

OTHER PUBLICATIONS

PCT Dec. 22, 2015 International Search Report and Written Opinion from the International Search Authority from International Application PCT/US2015/055370; 12 pages.
Weis, B., et al., "The Group Domain of Interpretation," Internet Engineering Task Force, RFC 6407, Oct. 2011; 64 pages.
Cisco Systems, Inc., "Medianet 2.3 Media Monitoring Troubleshooting Guide," Last Updated May 2012, © 2012, 102 pages.

\* cited by examiner

*Primary Examiner* — Robert Wilson
(74) *Attorney, Agent, or Firm* — Patent Capital Group (57) ABSTRACT

The present disclosure describes methods and systems for providing and enforcing scalable federated policies for network-provided flow-based performance metrics. Due to different security concerns related to different domains, varying group policies can be applied to different domains to ensure proper sharing and receipt of flow-based performance metrics. Some policies can limit the type of performance metric being shared among the nodes in the domain. Some policies allow less information to be exposed by specifying aggregated performance metrics to be shared among the nodes in the domain. A group key management infrastructure can be provided to enforce these group policies in the network in a scalable manner.

20 Claims, 6 Drawing Sheets

SCALABLE FEDERATED POLICY FOR NETWORK-PROVIDED FLOW-BASED PERFORMANCE METRICS

TECHNICAL FIELD

This disclosure relates in general to the field of communications and, more particularly, to providing scalable federated policy for network-provided flow-based performance metrics.

BACKGROUND

Modern communication networks provide the backbone of a variety of applications. These applications often involve one or more traffic flows for delivering content such as audio, video, data, etc. Network operators are tasked with providing a foundation network that can deliver a variety of applications to their users at any time. One example is Integrated Services Digital Network (ISDN), which is a set of simultaneous digital transmission of voice, video, data, and other network services over the traditional circuits of the public circuit switched telephone network. Another example is a packet switched network; yet another example is a hybrid of packet switched and circuit switched networks. For the most part, the network is in the background, humming away while users enjoy the applications. However, once in a while, the application will slow down, or hiccup, and the first suspect is usually the network.

For this reason, it is important for network operators to have a performance monitor which can collect and analyze the different performance metrics on a flow-by-flow basis. The performance monitor can be a single entity, or it can be a plurality of entities capable of collecting and monitoring performance metrics. In some solutions, the performance monitor can provide greater confidence within the network by its ability to analyze voice, video and data traffic and report on loss, latency and jitter. The performance monitor operates at the protocol level (e.g., at the Real-time Transport Protocol (RTP) and Transmission Control Protocol (TCP) level) by analyzing timestamps and sequence numbers to determine the health of the flows traversing the switch or router. The information gathered can be used to produce performance metrics on a flow-by-flow basis. The reports can guide the operator towards the location of the problem, problem ownership identification, and an accelerated resolution. In some implementations, the performance monitor can even prescribe per-application thresholds and actions, such that the performance monitor may even alert the network operator to an issue. Thus, network operators would often deploy performance monitors to increase their intelligence of the network and improve quality of various applications provided on the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

The present disclosure describes a scalable solution for allowing nodes to receive or send performance metrics securely by authenticating requests for performance metrics, checking the requests' respective authorization levels, and responding to the requests based on the corresponding authorization level. The authorization levels advantageously implements certain policies to ensure that different domains of the network is only sharing the type of performance metrics the domain is allowed to share.

The solution involves a method for providing flow-based performance metrics according to a group policy. A first sending node receives a request for performance metrics. The first sending node verifies the request using a first cryptographic key associated with the group policy. In response to verifying that the request is associated with the group policy, the first sending node can determining one or more first performance metrics based on group policy, and transmit the one or more first performance metrics according to the group policy. As described herein a group policy specifies one or more types of performance metrics to be shared among a group of nodes. Generally speaking, the group policy is among a plurality of group policies specifying different levels of authorizations to send or receive performance metrics.

The use of cryptographic keys enables sending nodes and receiver nodes to check whether the receiver node (requesting performance metrics) is allowed to receive performance metrics according to a certain group policy. Verifying the request using the first cryptographic key can involve decrypting the request using the first cryptographic key (or any suitable key associated with the group policy).

Several steps can be performed to obtain the appropriate cryptographic key. The first sending node can transmit an adding request from the first sending node to a group controller requesting to be added to the group policy. The group controller is preferably part of a scalable group key management infrastructure, and the first cryptographic key is distributed to the first sending node and other nodes associated with the group policy through a group key management protocol. In response to the first sending node being added to the group policy, the first sending node can receive the first cryptographic key associated with the group policy. The scalable group key management infrastructure preferably supports changes to the group and pushing of new keys accordingly. Accordingly, in response to membership to the group policy being updated (e.g., if another node is removed from the group), the first sending node can receive a second cryptographic key associated with the group policy. This second key is different from the first cryptographic key, and is usable for verifying a further request associated with the group policy (where said further request is not verifiable using the first cryptographic key).

The solution may provide a scalable feature where the need for other nodes to obtain the first cryptographic key is obviated. Instead, the first sending node can generate a group policy token in response to verifying that the request is associated with the group policy. Then, the first sending node can forward the group policy token and the request to a second node in the same domain as the first sending node. The second node is configured to transmit one or more second performance metrics towards the first sending node (acting as a collector of performance metrics) based on the group policy in response to verifying the forwarded request using the group policy token.

Example Embodiments

Basics of Collecting Performance Metrics

Network operators deploy performance monitors which can collect performance metrics from various nodes in a network. The performance metrics can include raw data associated with the performance of a node (e.g., memory and CPU utilization), a communication link (e.g., quality characteristics of a communication link), a network path of a traffic flow, and any derived information from such raw data. For instance, the performance monitor can monitor RTP, TCP, and Internet Protocol (IP) Constant Bit Rate (CBR) traffic throughout a network, thus collecting performance metrics on a flow-by-flow basis. Specifically, a performance monitor can analyze RTP-based audio and video flows and reports on service-affecting metrics, like packet loss and network jitter. For TCP flows, a performance monitor can report on round-trip time and packet loss occurrences. By measuring network performance on a hop-by-hop basis, the performance metrics collected along the network path allows granular fault isolation and simplifies troubleshooting of user traffic flows. In some cases, a performance monitor can measure traffic flow performance and can generate alerts based on thresholds, and reports the collected data through a command line interface or a network management system.

A performance monitor can maintain historical data about analyzed flows traversing various network nodes. The metrics collected by a performance monitor can be exported to a network management tool. The network management tool can further analyze, summarize, and correlate this information to provide traffic profiling, baselining, and troubleshooting services for the application and network operator of the user network.

Issue With Performance Metric Collection From Multiple Domains

Figure 1:
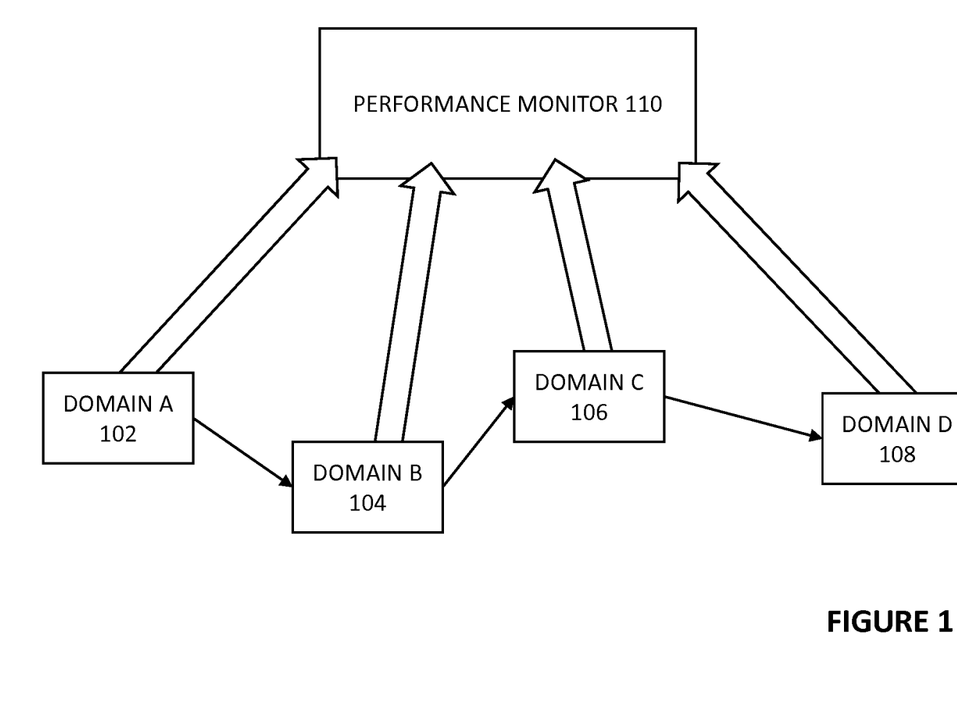
FIG. 1 shows a network having a plurality of domains, each reporting to a performance monitor, according to some embodiments of the disclosure.

FIG. 1 shows a network having a plurality of domains, each reporting to a performance monitor 110, according to some embodiments of the disclosure. Within the present disclosure, a domain is defined as a group of network nodes to which one or more group policies are enforced. A domain and a group (or a group of nodes) are used interchangeably herein. Phrased differently, a domain can encompass any nodes in the network (physical or virtual) belonging to a group, having one or more group policies that govern all the nodes. While typically the logical grouping of a domain is limited to a particular location or geographical area, it is not a necessary limitation. In other words, one or more group policies are enforced for every one of the network nodes in the domain. A domain can be managed by a particular entity or authority; different domains can be managed by different entities or authorities.

Referring back to FIG. 1, many of the traffic flows for applications being transported in the network can often traverse many domains, e.g., Domain A 102, Domain B 104, Domain C 106, and Domain D 108. For end to end performance monitoring (performance tracing), a performance monitor 110 can collect performance metrics (or data usable for determining performance metrics) from nodes belonging to different domains. Performance metrics include counters, hop-by-hop information, aggregated counters, aggregated quality metrics, etc. However, more often than not, different domains have the different group policies, which may dictate what type of performance metrics to share, and/or how much detail about the domain to share. For example, a domain may not want to share a particular type of performance metric. In another example, a domain may not want to share performance metrics which would expose details of the topology of the domain.

As more network nodes are equipped with functions for collecting data associated with various performance metrics, the issue of authorization and selective levels of access to the data is non-trivial when these nodes are governed by different group policies or managed by different authorities.

An Enhanced Performance Metric Collection Scheme

Generally speaking, a performance metric collection scheme involves senders and receivers of performance metrics. Senders ("sending nodes") are network nodes/elements that collect data related to performance metrics and are configured to share performance metrics. Examples of senders include network infrastructure components and sources of data. Receivers ("receiving nodes") are network nodes/elements supporting a collection scheme for performance metrics. Examples of receivers include domain managers, performance metric monitors, performance metric collectors, etc. Some network nodes can be a sender and a receiver. For instance, a receiver can collect performance metrics and transmit the collected metrics to another receiver.

In one example of performance tracing, a traffic flow can traverse a path through multiple network nodes, e.g., Router 1, Router 2, Router 3, and Switch 1 (in this order). Router 1 can receive a request for performance metrics for the flow. Acting as an "initiator" or "requestor", Router 1 forwards the request to Switch 1 (acting as a "destination" of the flow). Switch 1 forwards the request to Router 3 (acting as a responder). Router 3 forwards the request to Router 2 (acting as a responder). Router 2 forwards the request to Router 1 (back to the "initiator" or "requestor". The request being forwarded from hop to hop triggers a process to allow Router 1 to collect the performance metrics from Router 2, Router 3, and Switch 1. Once the performance metrics are collected, Router 1 may act as a sender to transmit the collected performance metrics to a performance monitor acting as a receiver.

Data related to performance metrics, data to which performance metrics can be determined, and performance metrics are used synonymously in the present disclosure. Performance metrics, including flow-based performance metrics, can include, e.g., information related to hop-by-hop analysis of traffic flows, system utilization statistics (e.g., memory and CPU utilization), network statistics, etc. The following list shows exemplary types of performance metrics, including flow-based performance metrics, which can be collected through performance tracing. Domains may select to only share certain types of performance metrics, and not other types of performance metrics.

Common metrics for each responder: metrics collection status, reachability address, ingress interface, egress interface, Internet Protocol (IP) Time to Live (TTL), hostname, hop count;

TCP Profile: flow sampling start timestamp, loss of measurement confidence, media stop event occurred, IP packet drop count, IP byte count, IP packet count, IP byte rate, IP differentiated services code point (DSCP), IP TTL, IP protocol, media byte count, TCP connect round trip delay, TCP lost event count;

RTP Profile: flow sampling start timestamp, loss of measurement confidence, media stop event occurred, IP packet drop count, IP byte count, IP packet count, IP byte rate, packet drop reason, IP DSCP, IP TTL, IP protocol, media byte rate average, media byte count, media packet count, RTP interarrival jitter average, RTP packets lost, RTP packets expected (pkts), RTP packet lost event count, RTP loss percent;

Central Processing Unit (CPU) profile: CPU utilization (1 min), CPU utilization (5 min), collection timestamp;

Memory profile: Processor memory utilization %, collection timestamp;

Application health metrics: health profile: requests received, time last request received, initiator of last request, requests dropped, max concurrent sessions supported, sessions currently active, sessions teared down, sessions timed out, hop info requests received, performance monitor requests received, performance monitor requests failed, static policy requests received, static policy requests failed, system data requests received, system data requests failed, application health requests received, local route change events, time of last route change event, number of unknown requests received; and Metrics for the request summary from initiator: request timestamp, request status, number of hops responded, number of hops with valid data, number of hops with error, number of hops with no data record, last route change timestamp, route index.

An enhanced performance metric collection scheme can advantageously address the issue of security with respect to various group policies, and furthermore, address the issue of scalability. Security of the enhanced performance metric collection scheme ensures the performance metrics are shared without violating group policies. To provide security, a node can implement an enhanced flow-based performance metrics sharing scheme. According to one aspect, nodes can authenticate a request to ensure the requestor is authentic ("is the requester part of the same group that the node is in?"). According to another aspect, nodes can verify the authorization level associated with a group policy and respond according to the authorization level. Scalability of the scheme relates to the issue that a network can have a large number of nodes, and as the number of nodes grow, the scheme should scale properly or reasonably. In other words, the scheme is preferably easy to manage for a large number of nodes sharing and receiving performance metrics. Scalability can be addressed through an efficient group key management and distribution, and the use of a group policy token.

In some embodiments, the enhanced scheme for providing flow-based performance metrics according to a group policy can include receiving a request for flow-based performance metrics at a sending node. The sending node, in the context of performance tracing, is usually the "initiator" or "requestor". The scheme further includes verifying, at the sending node, the request using a cryptographic key associated with the group policy (and thus the corresponding group policies). In response to verifying that the request is associated with the group policy, the sending node can determine one or more performance metrics based on the group policy, and transmit the one or more performance metrics according to the group policy. The determination can involve computing performance metrics from collected performance metrics. In some cases, the request is a probe, e.g., part of synthetic traffic, transmitted to sending node requesting performance metric(s). In some cases, the request is piggybacked with user traffic where certain fields of the traffic indicate a request for performance metric(s).

Preferably, when a node is equipped with the proper cryptographic key for a group, the key enables the node to verify the request. When a request is verified, the node assumes the request can be trusted for the particular group or domain and transmits a response to the request with performance metrics according to the group policy. Herein, a cryptographic key is used broadly to encompass one or more cryptographic keys usable for ensuring secured communications among senders and receivers having a security association among each other in the group. For simplicity, many examples herein describe a group that has a corresponding group policy and thus in some cases a group and a group policy are used interchangeably. However, it is envisioned that a group can have multiple group policies.

The present disclosure describes methods and systems for providing and enforcing scalable federated policies for network-provided flow-based performance metrics. Due to different security concerns related to different domains, varying group policies can be applied to respective domains to ensure proper sharing and receipt of flow-based performance metrics. Some policies can limit the type of performance metric being shared among the nodes in the domain. Some policies allow less information to be exposed by specifying aggregated performance metrics to be shared among the nodes in the domain. The use of cryptographic keys provides a security mechanism for ensuring senders and receivers are only sharing performance metrics prescribed by the group policy. In other words, the cryptographic keys used ensure that applicable group policies are followed. Furthermore, the enhanced scheme can be implemented using group key management infrastructure to distribute the cryptographic keys and enforce these group policies in the network in a scalable manner.

Exemplary Group Policies with Different Levels of Authorization

In the context of performance monitoring, the security concern lies with certain types of performance metrics revealing sensitive information about the domain that the domain may not want to share with other domains or nodes that the domain does not trust. For instance, a domain may not want to expose topology information associated with the domain. In another instance, a domain may not want to provide types of performance metrics which exposes information about the domain at a fine granularity (as opposed to types of performance metrics which aggregate information about the domain, area, or some other grouping of nodes). A group policy can specify one or more types of performance metrics to be shared among a group of nodes, thus defining a certain level of authorization to send and/or receive performance metrics. In some cases, the authorizations can specify whether to share performance metrics based on highly aggregated data or to share performance metrics based on fine-granularity data. Different group policies can accordingly define different levels of authorizations. In some cases, the group policies may also define how to process requests for performance metrics. Examples of different group policies can specify any one of the following exemplary levels of authorizations:

Return all per-hop counters and performance metrics;
  Return aggregated counters and performance metrics, either per area, or per domain;
  Return only hop information but no counters or performance metrics; and
  Do not return any information but transit the request to the next domain.

Various Schemes for Establishing Security

Security can be established between sending nodes and receiving nodes using different cryptography schemes.

In one example, the sending nodes and receiving nodes of a zone can all have a shared secret cryptographic key to encrypt and decrypt requests and responses. In some embodiments, these keys can be pre-distributed in the senders and receivers before deployment. In some other embodiments, these keys can be distributed to the senders and receivers using a trusted third-party. In some cases, keys can be distributed to senders and receivers through a public key infrastructure. In yet some other embodiments, the keys are distributed using the senders and receivers themselves to establish group security.

In another example, for a more scalable and manageable approach, cryptographic keys can be distributed to senders and receivers associated with different groups (i.e., group policies) through a group key management protocol. An example of such a protocol is Group Domain of Interpretation (GDOI). Such a protocol can distribute keys to many groups in a scalable manner. Furthermore, such a protocol can manage changes to the group membership or changes to the groups themselves.

Exemplary Implementation of a Sender or Receiver

Figure 2:
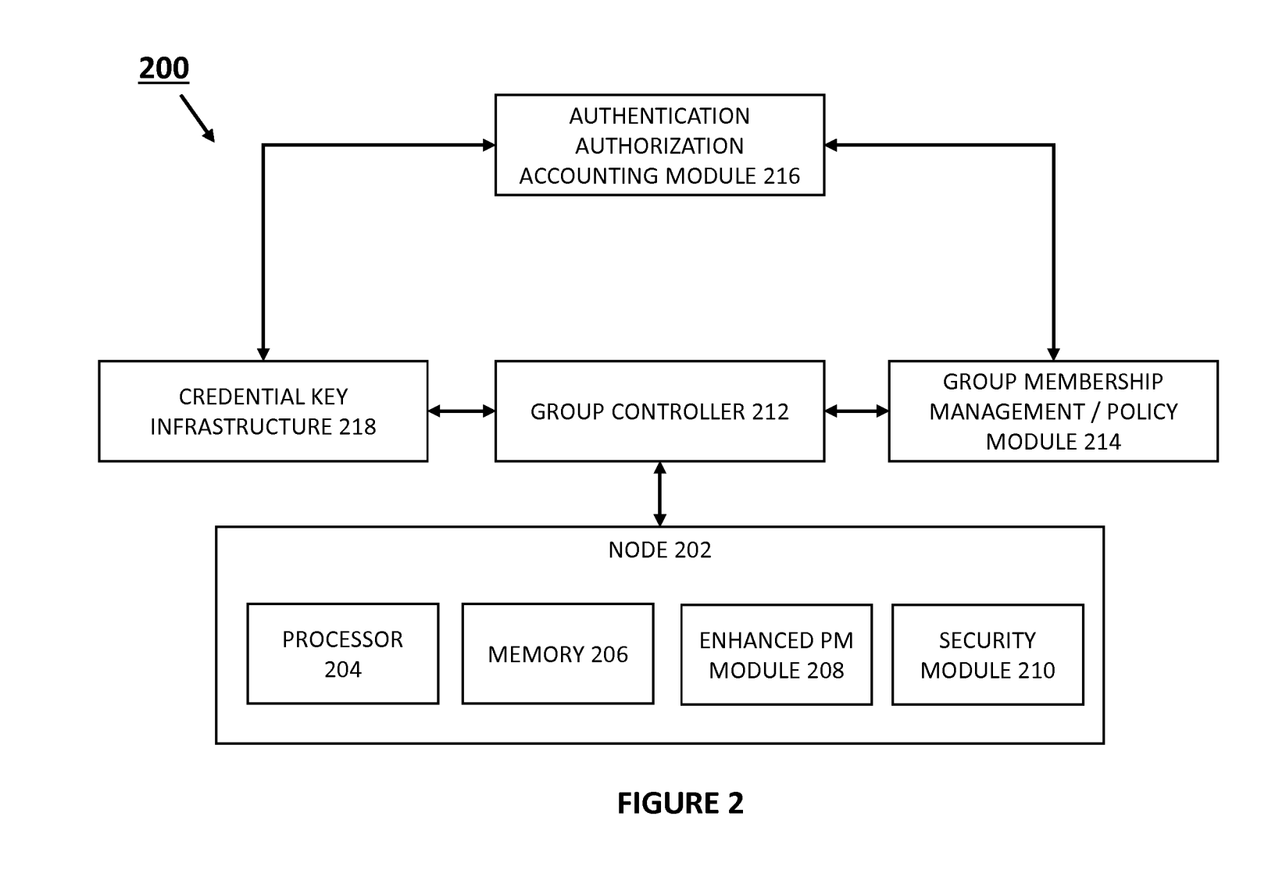
FIG. 2 shows a system for establishing security associations among senders and receivers of performance metrics and an exemplary sending/receiving node implementing an enhanced method for transmitting flow-based performance metrics based on a group policy, according to some embodiments of the disclosure.

FIG. 2 shows a system for establishing security associations among senders and receivers of performance metrics and an exemplary sending/receiving node implementing an enhanced method for transmitting flow-based performance metrics based on a group policy, according to some embodiments of the disclosure. The system 200 shows a node 202 (which can be a sender and/or a receiver) and a group key management infrastructure having group controller 212, group membership management and policy (GMMP) module 214, authentication/authorization/accounting module (AAA) 216, and credential key infrastructure 218. The node 202 is communicably connected to the group key management infrastructure via group controller 212.

The node 202 comprises processor 204, memory element 206, enhanced performance metric (PM) module 208, and security module 210. The memory element 206 can include data, and/or instructions and is coupled to processor 204. Exemplary data can include cryptographic keys, group policies, and performance metrics for node 202. The instructions on the memory 206, when executed by the processor 204 can, implement the functions of the enhanced PM module 208 and security module 210. The security module 210 is generally used for obtaining or receiving one or more cryptographic keys for the node 202. In some cases, the security module 210 can obtain, store, and/or maintain one or more group policies to be enforced (e.g., filters for performance metrics or rules for performance metrics). The enhanced PM module 208 can be configured to receive a request for performance metrics. Upon receiving the request, the security module 210 can verify the request using one or more of the cryptographic keys. For instance, the security module 210 can attempt to decrypt the request using the one or more cryptographic keys (or any suitable cryptographic key obtained using cryptographic key(s) received from the group key management infrastructure).

Figure 3:
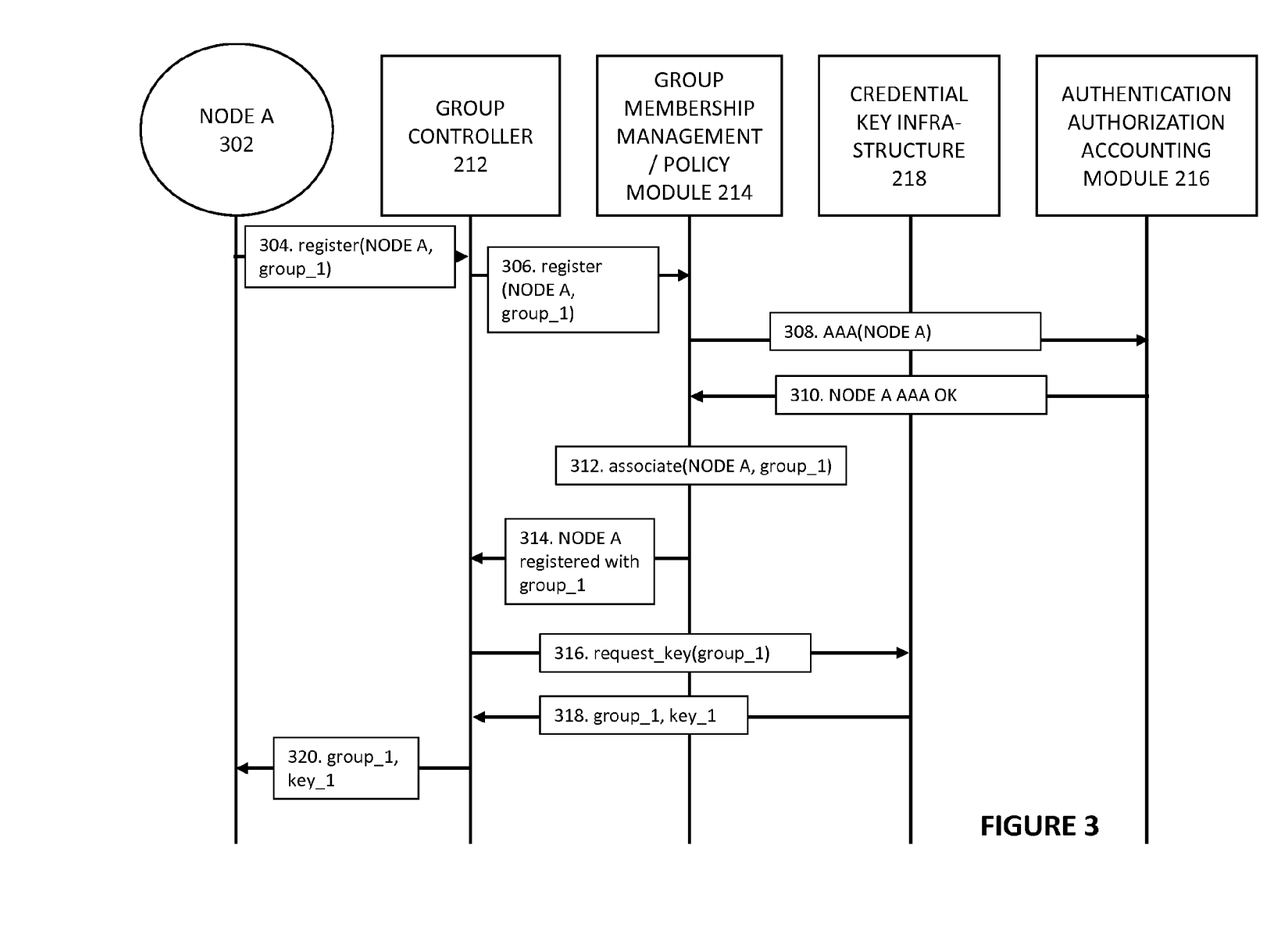
FIG. 3 shows a messaging diagram illustrating an exemplary process for a node to pull a key for a group policy, according to some embodiments of the disclosure.
Figure 4:
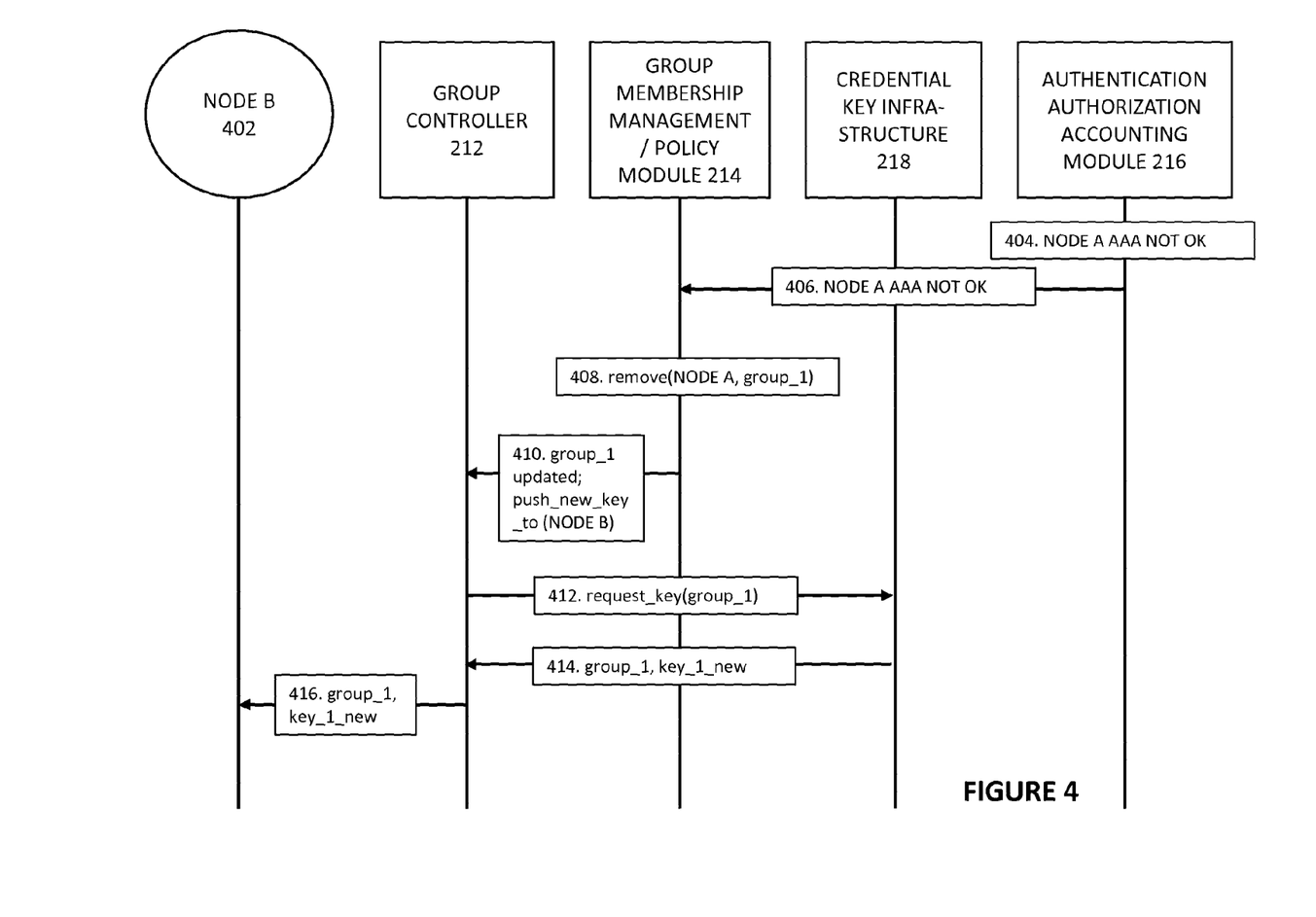
FIG. 4 shows a messaging diagram illustrating an exemplary process for pushing a key for a group policy to a node, according to some embodiments of the disclosure.

Details of the group key management infrastructure and respective processes are described in relation to FIGS. 3 and 4. The enhanced PM module 208 and security module 210 can perform other functions related to the processing of the request, which are described in detail in relation to FIGS. 5A-B.

Exemplary Group Key Management Infrastructure

The group key management infrastructure would generally include AAA module 216, which can perform authentication (i.e., verify whether a node's identity is authentic), authorization (i.e., verify whether the node is authorized to use the group key management infrastructure), and accounting (i.e., verify whether the node is subscribed to the group key management infrastructure/service, or adjust fees according to the usage of the group key management infrastructure). AAA module 216 may be communicably connected to GMMP module 214 and credential key infrastructure 218. Credential key infrastructure 218 can generate cryptographic keys (or tokens) for nodes such as node 202. GMMP module 214 may maintain groups and respective memberships to the group. For instance, GMMP module 214 may maintain rosters for each group. Furthermore, GMMP module 214 may provide group policy information/filters/functions or identification thereof to node 202 such that node 202 can properly enforce group policies according to a group. In some cases, GMMP module 214 can implement network-wide policies by means of group membership assignments. Group controller 212 can serve to coordinate cryptographic keys to be pulled or pushed to nodes such as node 202.

In some embodiments, the group key management infrastructure of FIG. 2 can implement GDOI (IETF Standard, RFC 6407). GDOI is based on Internet Security Association and Key Management Protocol (ISAKMP), RFC 2408, and Internet Key Exchange version 1 (IKE). Whereas IKE is run between two peers to establish a "pair-wise security association", GDOI protocol is run between a group member such as node 202 (e.g., between an "initiator" or "requestor" in the context of performance tracing, and a performance monitor) and group controller 212. Specifically, GDOI establishes a security association among two or more group members (e.g., senders and receivers of performance metrics). For instance, a performance monitor and "initiator" or "requestor" in the context of performance tracing would use the group key management infrastructure to establish security association with each other according to a group policy. While the following figures are described in relation to GDOI, ISAKMP, and IKE, it is envisioned by the disclosure that other protocols can also be used for implementing group security associations for senders and receivers belonging to the same domain (e.g., for instance, Public Key Infrastructure).

To logically associate senders and receivers to a group, the group key management infrastructure distributes and updates a cryptographic key (e.g., a key encrypting key) that is common to the group. Such a process establishes security associations among senders and receivers of a particular group (having one or more respective group policies). The cryptographic key is an important state for security modules of senders and receivers (e.g., security module 210 of FIG. 2), as a cryptographic key can encrypt keys that can decrypt application data. There are two mechanisms for node 202 to obtain the cryptographic key which ensures secured sharing and receipt of performance metrics according to a group policy. A first mechanism, illustrated by FIG. 3, is a "pull"

mechanism, where node 202 initiates a request to obtain the cryptographic key. A second mechanism, illustrated by FIG. 4, is a "push" mechanism, where a cryptographic key is sent to the node without the node requesting the cryptographic key.

In some cases, the cryptographic key obtained directly from the group key management infrastructure is not used for encrypting requests for performance metrics or responses for performance metrics. However, that key can enable other cryptographic keys to be obtained (e.g., through public key infrastructure or some other suitable protocol) which would be used for encrypting requests and responses.

Pull Mechanism

FIG. 3 shows a messaging diagram illustrating an exemplary process for a node to pull a key for a group policy, according to some embodiments of the disclosure. In this example, node A 302 transmits an explicit request to group controller 212 to register node A to a group, group_1 (by message 304). In other words, node A 302 transmits an adding request to the group controller 212 requesting to be added to group_1. Group controller 212 can forward or relay the request to GMMP module 214 (message 306). Before the GMMP module 214 can add node A 302 to group_1, the GMMP module 214 transmits a request to AAA module 216 requesting to verify authenticity, authorization and/or accounting for node A 302 (message 308). If AAA module 216 determines authenticity, authorization and/or accounting is verified for node A, AAA module 216 can transmit a response indicating to the GMMP module 214 that authenticity, authorization, and/or accounting is verified for node A (message 310). In response to receiving message 310, GMMP module 214 can associate node A with group_1 (box 312).

In the event that AAA module 216 does not determine that authenticity, authorization and/or accounting is verified for node A 302, the AAA 216 can transmit a response to the GMMP module 214 to indicate that node A 302 cannot be verified. The GMMP 214 would not add the node A 302 to group_1 if such as response is received from AAA module 216, and may instruct the group controller 212 to inform node A 302 of the failure to add node A 302 to group_1.

GMMP 214 can transmit a response to group controller 212 to indicate that node A has been successfully registered with group_1 (message 314). In response to receiving such confirmation, the group controller 212 can transmit a request to credential key infrastructure 218 to request a cryptographic key for group_1 for node A (message 316). In some alternative embodiments, AAA module 216 can communicate with credential key infrastructure 218 to request key_1 to be transmitted from credential key infrastructure 218 to group controller 212 (and subsequently from group controller 212 to node A 302).

Credential key infrastructure 218 can transmit the cryptographic key key_1 for group_1 to group controller 212 (message 318). Group controller 212 can push key_1 for group_1 to node A (message 320). Phrased differently, in response to node A being added to group_1 or group policy caused by node A's request, node A receives the cryptographic key key_1 associated with group_1 (and any one or more group policies associated with group_1) in the pull mechanism.

Push Mechanism

Instead of a node transmitting an explicit request for a cryptographic key, changes at the GMMP module 214 such as changes in group membership and/or policy can initiate a "push" mechanism to push a cryptographic key to nodes. These changes can include, e.g., adding a node to a group (and respective group policies), removing a node from a group (and respective group policies), creating a new group with associated a set of nodes, and deleting a group, etc. All of these changes can affect the group membership relationship between a node and a group.

When group memberships are updated, the group controller 212 can send ("push") unsolicited updates to members (i.e., nodes that are still members to the group) over multicast, broadcast or unicast channels. Advantageously, group key updates are pushed and can reach any number of group members with a single efficient transmission from the controller. Accordingly, the group key management infrastructure can provide a scalable way for distributing keys to senders and receivers because the infrastructure uses and supports multicast messaging for very large groups. Group membership updates can include removal of nodes from a group as well, where the group key management infrastructure would push cryptographic keys to only a subset of the group (i.e., the remaining nodes not removed from the group) to implement selective key updates. Furthermore, the push mechanism is triggered when cryptographic keys expire and are renewed.

FIG. 4 shows a messaging diagram illustrating an exemplary process for pushing a key for a group policy to a node, according to some embodiments of the disclosure. In this example, a group, group_1, originally has at least node A and node B. Due to a change in membership, node A is to be removed from group_1. The change in membership can be initiated in different parts of the group key management infrastructure. In one example, AAA module 216 can determine that node A's authenticity, authorization, and/or accounting can no longer be verified (box 404), and accordingly transmits to GMMP module 214 to indicate that node A is no longer, e.g., authenticated, authorized, or have proper accounting/subscription (message 406). Alternatively, the GMMP module 214 initiates the removal of node A from group_1, e.g., due to policy changes, expiration of membership, etc. (box 408).

In response to node A being removed from group_1, GMMP module 214 determines one or more nodes remaining in group_1 needs a new key. GMMP module 214 transmits a message to group controller 410 to indicate that group_1 has been updated, and a new key is needed for the remaining nodes, e.g., node B (message 410). The group controller 212 can transmit a request for a new key for group_1 (message 412) to credential key infrastructure 218. The credential key infrastructure 218 can then transmit a new key, key_1_new for group_1 to group controller 212 (message 414). The group controller 212 then pushes key_1_new to the remaining nodes of group_1, in this case, to node B (message 416). If there are a plurality of remaining nodes, the group controller 212 can transmit key_1_new to those remaining nodes via multicast.

Through the push mechanism shown in FIG. 4, node A having an old key is effectively removed from group_1 due to node A not having the new/updated key to verify further requests for group_1. The new key can be used for those further requests, which the remaining nodes having the new key can verify. Phrased differently, in response to membership to the group policy being updated, node B 402 can receive a new/different cryptographic key key_1_new associated with the group policy. This new/different key key_1_new is usable for verifying a further request associated with the group policy. However, the further request is not verifiable using the old cryptographic key key_1.

Similarly, new/different cryptographic keys can be pushed via messages such as messages 410, 412, 414, and 416 through the same mechanism when old keys are expired, or when old keys are to be updated with updated keys.

Security Enhanced Performance Metrics Collection Scheme

Performance metrics collected through performance tracing of a path of a traffic flow can be performed using different modes, e.g., "individual response mode" and "concatenated response mode".

In individual response mode, a node (a "responder" or a "destination") that is to service a request is required to send performance metrics ("a response") for a particular request back to the "initiator" or "requestor" using a direct reply message. The message that contains the request can be independently forwarded further along the path, without needing to await processing by the node. Within the context of performance tracing, an initiator can transmit the request to the destination, and the destination would transmit the request back towards the initiator through one or more responders in the path of the flow. The destination and responder(s) would individually transmit a response with performance metrics to the initiator in response to receiving the request as the request traverses through the path of the flow.

In concatenated response mode, a node (a "responder") that is to service a request does not need to send its response individually. Instead, the node has the option to piggyback its response onto the message that carried the request and forward it along with the request. Nodes keep adding their responses onto the message until the message reaches the initiator, or if a node further along the path (e.g. the destination node) sends a reply message that combines this response with responses from other hops. Within the context of performance tracing, an initiator or requestor would transmit the request to the destination, and the destination would transmit the request back towards the initiator through one or more responders in the path of the flow. The destination and responder(s) can piggyback performance metrics (adding onto the request being forwarded along the path) in response to receiving the request as the request traverses through the path of the flow. In the case that a message cannot carry more performance metrics because it would exceed length limitations (e.g., imposed by the underlying transport), a node may send piggybacked responses, as well as its own response, back to the initiator using a direct reply message, effectively reverting to individual response mode.

In both of these modes, a node would forward the request to the next hop, with or without the node's own performance metrics. When a security scheme is provided with the performance metrics collection scheme, it is possible to leverage the existing requests being forwarded from hop to hop (e.g., node to node) within a domain to also carry a group policy token summarizing the verification of the request (and the group policy associated with the request).

The group policy token can be generated by a security module of a node which has already verified the request being associated with a particular group (e.g., at the "initiator" or "requestor" of the performance tracing scheme) to reduce the need to verify the request again at the next hop (i.e., determine again whether the request is associated with the particular group). The group policy token preferably has a limited time to live, or is usable only once, and/or usable for the lifetime of the request as it traverses from hop to hop within the domain. Effectively, when a node (e.g., at the boundary of a domain, or an "initiator" or "requestor") has verified the request, a security module can generate a group policy token (which summarizes the verification of the request for the group policy at the "initiator" or "requestor") that can be passed to the next hop. The next hop can continue to enforce the group policy, e.g., using the information provided in the token. The token can include secret information, such as a cryptographic key, used to prove the verification of the request. In some embodiments, the token includes the group policy to be enforced. Broadly speaking, the token may provide security to the next hop such that the next hop can trust the request and enforce the group policy when the next hop responds to the request (without having obtained a cryptographic key from the group key management infrastructure).

Figure 5A:
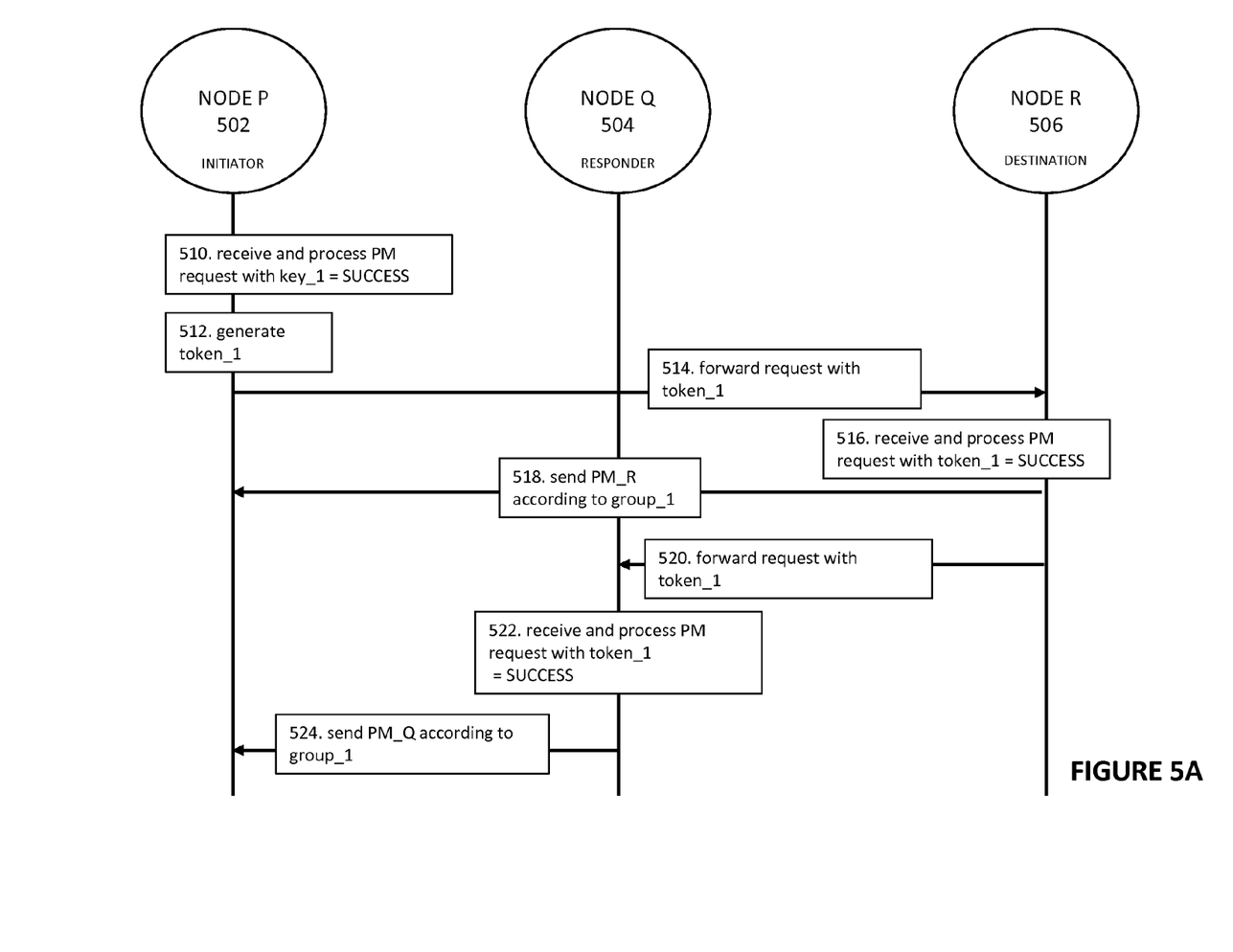
FIG. 5A shows a messaging diagram illustrating an exemplary process for processing a request for performance metrics, according to some embodiments of the disclosure.

FIG. 5A shows a messaging diagram illustrating an exemplary process for processing a request for performance metrics, according to some embodiments of the disclosure. The messaging shown corresponds to a security enhanced scheme being used with individual response mode as a request is being passed from node to node (hop to hop) within a domain. In this simplified example, Node P 502 can be an "initiator" or "requestor". Node R 506 is the destination, and node Q 504 is a responder (the example can extend to the case with more responders).

Node P 502 receives and verifies a request for performance metrics successfully using a cryptographic key_1 corresponding to group policy group_1 (box 510). The cryptographic key_1 can be obtained via the group key management infrastructure (or using a key obtained from the group key management infrastructure). Node P 502 can generate a group policy token token_1 (box 512), and transmit or forward the (already-verified) request with token_1 to node R 506 (message 514). Node R 506 receives and processes the request with token_1 (box 516). Node R 506 transmits performance metrics of node R 506 according to group_1 to node P 502 (message 518). Node R 506 transmits or forwards the (already-verified) request with token_1 to Node Q 504 (message 520). Node Q 504 receives and processes the request with token_1 (box 522). Node Q 504 transmits performance metrics of node Q 504 according to group_1 to node P 502 (message 524).

Figure 5B:
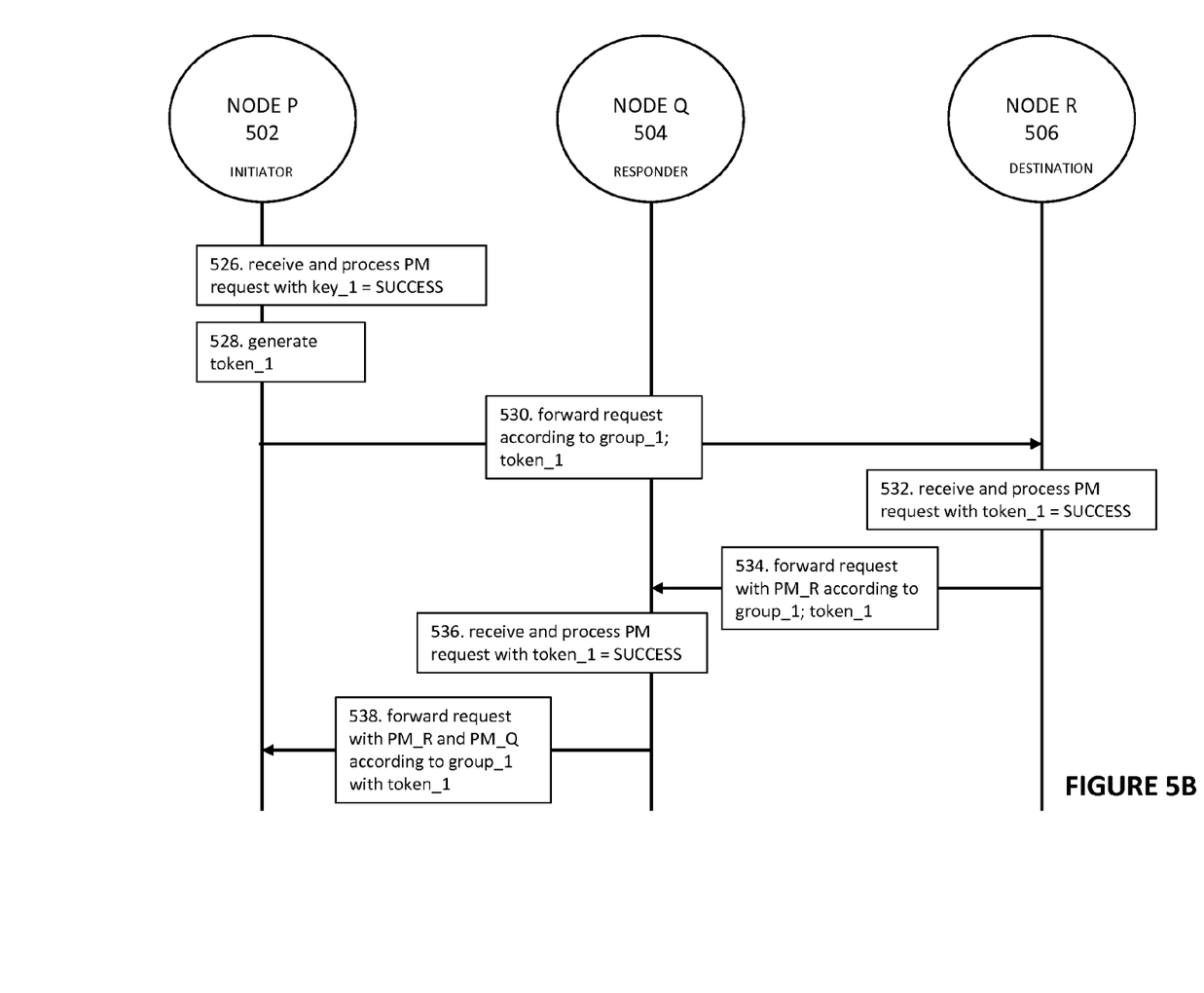
FIG. 5B shows a messaging diagram illustrating another exemplary process for processing a request for performance metrics, according to some embodiments of the disclosure.

FIG. 5B shows a messaging diagram illustrating another exemplary process for processing a request for performance metrics, according to some embodiments of the disclosure. The messaging shown corresponds to a security enhanced scheme being used with concatenated response mode as a request is being passed from node to node (hop to hop) within a domain. In this simplified example, node P 502 can be an "initiator" or "requestor". Node R 506 is the destination, and node Q 504 is a responder (the example can extend to the case with more responders).

Node P 502 receives and verifies a request for performance metrics successfully using a cryptographic key_1 corresponding to group policy group_1 (box 526). The cryptographic key_1 can be obtained via the group key management infrastructure (or using a key obtained from the group key management infrastructure). Node P 502 can generate a group policy token token_1 (box 528), and transmit or forward the (already-verified) request with token_1 to node R 506 (message 530). Node R 506 receives and processes the request with token_1 (box 532). Node R 506 forwards request with performance metrics of node R 506 according to group_1 with token_1 to node Q 504 (message 534). The performance metrics of node R 506 according to group_1 is piggybacked with the request. Node Q 504 receives and processes the request with token_1 (box 536). Node Q 504 forwards request with performance metrics of node Q 504 according to group_1 and performance metrics of node R 506 according to group_1 with token_1 to node P 502 (message 538). Both the performance metrics of node Q 504 and node R 506 according to group_1 are piggybacked with the request.

Variations and Implementations

Within the context of the disclosure, a network used herein represents a series of points, nodes, or network nodes/elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

As used herein in this Specification, the term 'network element' or 'network node' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements/nodes may include any suitable hardware, software, components, modules, interfaces, or objects that facilitate the policy operations thereof. This may be inclusive of appropriate algorithms and communication protocols that allow for the effective exchange of data or information.

In one implementation, sending nodes and receiving nodes described herein may include software to achieve (or to foster) the functions discussed herein for providing the scalable federated policy functions where the software is executed on one or more processors to carry out the functions. This could include the implementation of instances of enhanced performance metrics modules, security modules, and/or any other suitable element that would foster the activities discussed herein. Additionally, each of these elements can have an internal structure (e.g., a processor, a memory element, etc.) to facilitate some of the operations described herein. In other embodiments, these functions for scalable federated policy for network-provided flow-based performance metrics may be executed externally to these elements, or included in some other network element to achieve the intended functionality. Alternatively, sending and receiving nodes may include software (or reciprocating software) that can coordinate with other network elements/nodes in order to achieve the scalable federated policy functions described herein. In still other embodiments, one or several devices may include any suitable algorithms, hardware, software, components, modules, interfaces, or objects that facilitate the operations thereof.

In certain example implementations, the scalable federated policy functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store cryptographic keys, group policies, or any suitable data for implementing a scalable federated policy for network-provided flow-based performance metrics. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements/nodes, etc.) can include memory elements for storing information to be used in achieving scalable federated policy for network-provided flow-based performance metrics, as outlined herein. Additionally, each of these devices may include a processor that can execute software or an algorithm to enforce the scalable federated policy for network-provided flow-based performance metrics as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements/nodes can also include suitable interfaces for receiving, transmitting, and/or otherwise communicating data or information in a network environment.

Additionally, it should be noted that with the examples provided above, interaction may be described in terms of two, three, or four network elements/nodes. However, this has been done for purposes of clarity and example only. In certain cases, it may be easier to describe one or more of the functionalities of a given set of flows by only referencing a limited number of network elements/nodes. It should be appreciated that the systems described herein are readily scalable and, further, can accommodate a large number of components, as well as more complicated/sophisticated arrangements and configurations. Accordingly, the examples provided should not limit the scope or inhibit the broad techniques of scalable federated policy for network-provided flow-based performance metrics, as potentially applied to a myriad of other architectures.

It is also important to note that the steps and messages in FIGS. 3, 4, 5A and 5B illustrate only some of the possible scenarios that may be executed by, or within, the components shown in FIG. 2. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the system of FIG. 2 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for providing flow-based performance metrics according to a group policy, the method comprising:
   receiving, at a first sending node, a request for performance metrics;
   verifying, at the first sending node, the request using a first cryptographic key associated with the group policy; and
   in response to verifying that the request is associated with the group policy:
      determining one or more first performance metrics based on the group policy; and
      transmitting the one or more first performance metrics according to the group policy.

2. The method of claim 1, further comprising:
   transmitting an adding request from the first sending node to a group controller requesting to be added to the group policy.

3. The method of claim 1, further comprising:
   in response to the first sending node being added to the group policy, receiving the first cryptographic key associated with the group policy.

4. The method of claim 1, further comprising:
   in response to membership to the group policy being updated, receiving a second cryptographic key associated with the group policy, said second cryptographic key different from the first cryptographic key usable for verifying a further request associated with the group policy, said further request not verifiable using the first cryptographic key.

5. The method of claim 1, wherein:
   verifying the request using the first cryptographic key comprises decrypting the request using the first cryptographic key.

6. The method of claim 1, wherein the first cryptographic key is distributed to the first sending node and other nodes associated with the group policy through a group key management protocol.

7. The method of claim 1, wherein further comprising:
   generating a group policy token in response to verifying that the request is associated with the group policy; and
   forwarding the group policy token and the request to a second node in the same domain as the first sending node, said second node configured to transmit one or more second performance metrics towards the first sending node based on the group policy in response to verifying the request forwarded to the second node using the group policy token.

8. The method of claim 1, wherein the group policy specifies one or more types of performance metrics to be shared among a group of nodes.

9. The method of claim 1, wherein the group policy is among a plurality of group policies specifying different levels of authorizations to send or receive performance metrics.

10. A first sending node for providing flow-based performance metrics according to a group policy comprising:
   at least one memory element storing instructions for a performance metrics module and instructions for a security module; and
   at least one processor coupled to the at least one memory element for executing the instructions;
   wherein the performance metrics module, when the instructions for the performance metrics module are executed by the at least one processor, receives a request for performance metrics;
   wherein the security module, when the instructions for the security module are executed by the at least one processor, verifies the request using a first cryptographic key associated with the group policy; and
   wherein the performance metrics module, when the instructions for the performance metrics module are executed by the at least one processor, determines one or more first performance metrics based on the group policy, and transmits the one or more first performance metrics according to the group policy.

11. The first sending node of claim 10, wherein the at least one memory element stores the first cryptographic key and the security module receives the first cryptographic key through a group key management protocol.

12. The first sending node of claim 10, wherein:
   the security module, when the instructions for the security module are executed by the at least one processor, generates a group policy token in response to verifying that the request is associated with the group policy; and
   the performance metrics module, when the instructions for the performance metrics module are executed by the at least one processor, forwards the group policy token and the request to a second node in the same domain as the first sending node, said second node transmits one or more second performance metrics towards the first sending node based on the group policy in response to verifying the request forwarded to the second node using the group policy token.

13. A computer-readable non-transitory medium comprising one or more instructions providing flow-based performance metrics according to a group policy, when the one or more instructions are executed by one or more processors, the following operations are performed:

receiving, at a first sending node, a request for performance metrics;

verifying, at the first sending node, the request using a first cryptographic key associated with the group policy; and in response to verifying that the request is associated with the group policy:

determining one or more first performance metrics based on group policy; and transmitting the one or more first performance metrics according to the group policy.

14. The computer-readable non-transitory medium of claim 13, wherein the operations being performed when the one or more instructions in the computer-readable non-transitory medium are executed by the one or more processors further comprises:

transmitting an adding request from the first sending node to a group controller requesting to be added to the group policy.

15. The computer-readable non-transitory medium of claim 13, wherein the operations being performed when the one or more instructions in the computer-readable non-transitory medium are executed by the one or more processors further comprises:

in response to the first sending node being added to the group policy, receiving the first cryptographic key associated with the group policy.

16. The computer-readable non-transitory medium of claim 13, wherein the operations being performed when the one or more instructions in the computer-readable non-transitory medium are executed by the one or more processors further comprises:

in response to membership to the group policy being updated, receiving a second cryptographic key associated with the group policy, said second cryptographic key different from the first cryptographic key usable for verifying a further request associated with the group policy, said further request not verifiable using the first cryptographic key.

17. The computer-readable non-transitory medium of claim 13, wherein the operations being performed when the one or more instructions in the computer-readable non-transitory medium are executed by the one or more processors further comprises receiving, by the first sending node, through a group key management protocol.

18. The computer-readable non-transitory medium of claim 13, wherein the operations being performed when the one or more instructions in the computer-readable non-transitory medium are executed by the one or more processors further comprises:

generating a group policy token in response to verifying that the request is associated with the group policy; and forwarding the group policy token and the request to a second node in the same domain as the first sending node, said second node configured to transmit one or more second performance metrics towards the first sending node based on the group policy in response to verifying the request forwarded to the second node using the group policy token.

19. The computer-readable non-transitory medium of claim 13, wherein the computer-readable non-transitory medium further stores the group policy, and the group policy specifies one or more types of performance metrics to be shared among a group of nodes.

20. The computer-readable non-transitory medium of claim 13, wherein the computer-readable non-transitory medium further stores the group policy, and the group policy is among a plurality of group policies specifying different levels of authorizations to send or receive performance metrics.

* * * * *